United States Patent [19]
Biber

[11] Patent Number: 5,492,296
[45] Date of Patent: Feb. 20, 1996

[54] ADJUSTABLE STAND FOR AN OPTICAL VIEWING APPARATUS

[75] Inventor: Klaus Biber, Aalen, Germany

[73] Assignee: Carl-Zeiss-Stiftung, Heidenheim, Germany

[21] Appl. No.: 125,116

[22] Filed: Sep. 21, 1993

[30] Foreign Application Priority Data

Sep. 21, 1992 [DE] Germany ............... 42 31 516.6

[51] Int. Cl.⁶ ..................................... F16L 3/00
[52] U.S. Cl. ................... 248/292.13; 403/111; 403/120
[58] Field of Search ............... 248/280.1, 292.1, 248/297.1, 278, 123.1; 403/111, 120

[56] References Cited

U.S. PATENT DOCUMENTS

| | | | |
|---|---|---|---|
| 2,151,877 | 3/1939 | Walker | 248/123.1 |
| 2,739,778 | 3/1956 | Krone et al. | 403/111 |
| 4,339,100 | 7/1982 | Heller et al. | |
| 4,537,233 | 8/1985 | Vroonland et al. | 248/292.1 X |
| 4,548,373 | 10/1985 | Komura | 248/280.1 X |
| 4,703,909 | 11/1987 | Dayton et al. | 248/280.1 |
| 4,768,744 | 9/1988 | Leeds et al. | 248/280.1 |
| 4,771,979 | 9/1988 | Nakazawa et al. | 248/292.1 X |
| 4,881,709 | 11/1989 | Nakamura | 248/280.1 X |
| 4,919,376 | 4/1990 | Uehara et al. | 248/292.1 X |
| 5,186,422 | 2/1993 | Nakamura | 248/280.1 X |
| 5,213,293 | 5/1993 | Muentener et al. | 248/162.1 X |
| 5,288,043 | 2/1994 | Tigliev | 248/278 |

*Primary Examiner*—Karen J. Chotkowski
*Attorney, Agent, or Firm*—Walter Ottesen

[57] ABSTRACT

The invention is directed to an adjustable stand for an optical viewing apparatus such as a surgical microscope pivotable about a pivot axis. The adjustable stand and the optical viewing apparatus conjointly define a center of gravity which can shift to produce an unwanted unbalancing torque when accessories are added to the microscope and/or when there is angular movement about the axis. The adjustable stand includes a mounting bracket for attaching the stand at a desired location; a pivot shaft defining the pivot axis; a carrier holding the pivot shaft and an elastically deformable energy storage device mounted on the shaft for releasing stored torque energy in response to the shift to balance the unwanted unbalancing torque. An adjusting device is provided for loading the storage means with a predetermined torque.

32 Claims, 7 Drawing Sheets

ADJUSTABLE STAND FOR AN OPTICAL VIEWING APPARATUS

FIELD OF THE INVENTION

The invention relates to an adjustable stand for an optical viewing apparatus such as a surgical microscope. The adjustable stand includes a tilt shaft and a pivot shaft for the microscope. The adjustable stand also includes a carrier interconnecting these shafts and a flange or bracket for attaching the adjustable stand to a base, ceiling or wall.

BACKGROUND OF THE INVENTION

Adjustable stands for surgical microscopes have the purpose off permitting the surgical microscope to be aligned to the operating field rapidly and precisely. The movements of the stand in all directions should take place simply and without difficulty. Stands of this kind are disclosed, for example, in U.S. Pat. No. 4,339,100, In known stands, the surgical microscope can execute rotational movements about two axes during alignment to the operating field. These rotational movements are tilting forwardly or rearwardly and pivoting to the left or right. The displacement of the center of gravity because of the tilt and pivot movements are counterbalanced in known stands by adjustably arranged counterweights as well as by rotational bearings and brake bearings. The total weight of the surgical microscope can be changed by accessory parts such as accessory parts for simultaneous viewing by an associate, documentation and assistance. The change in total weight likewise leads to a displacement of the center of gravity of the apparatus which must also be counterbalanced.

It is a disadvantage of these known stands that additional masses are required for the compensating weights or for the brake and rotation bearings. These masses lead to an unwanted loading of the stands and disadvantageously increase the needed space for the stand configuration.

SUMMARY OF THE INVENTION

In view of the foregoing, it is an object of the invention to provide an adjustable stand for an optical viewing apparatus which avoids the above disadvantages.

The adjustable stand of the invention is for an optical viewing apparatus such as a surgical microscope pivotable about a pivot axis. The adjustable stand is attachable to a desired location on a pedestal, an additional stand, ceiling or wall and the adjustable stand and the optical viewing apparatus conjointly define a center of gravity which can shift to produce an unwanted unbalancing torque when accessories are added to the microscope and/or when there is angular movement about said axis.

The adjustable stand of the invention includes: a mounting bracket for attaching the stand at the desired location; a pivot shaft defining the pivot axis; a carrier operatively connected to the mounting bracket and holding the pivot shaft; elastically deformable energy storage means mounted on the shaft for releasing stored torque energy in response to the shift to balance the unwanted unbalancing torque; and, adjusting means for loading the storage means with a predetermined torque.

The viewing apparatus can also be tiltable about a tilt axis about which the unwanted unbalancing torque can also be produced because of the shift of the center of gravity. Accordingly, and pursuant to another feature of the invention, the adjustable stand can include a tilt shaft defining the tilt axis and the carrier then interconnects the tilt and pivot shafts. The elastically deformable energy storage means is then mounted on at least one of the shafts for releasing the stored torque energy in response to the shift to balance the unwanted unbalancing torque.

The advantages obtained with the invention make possible the compensation of position changes of the center of gravity of the apparatus as well as to execute tilt and/or pivot movements of the surgical microscope virtually without difficulty and without loading the stand with significant additional loads or to increase its size in an undesirable manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
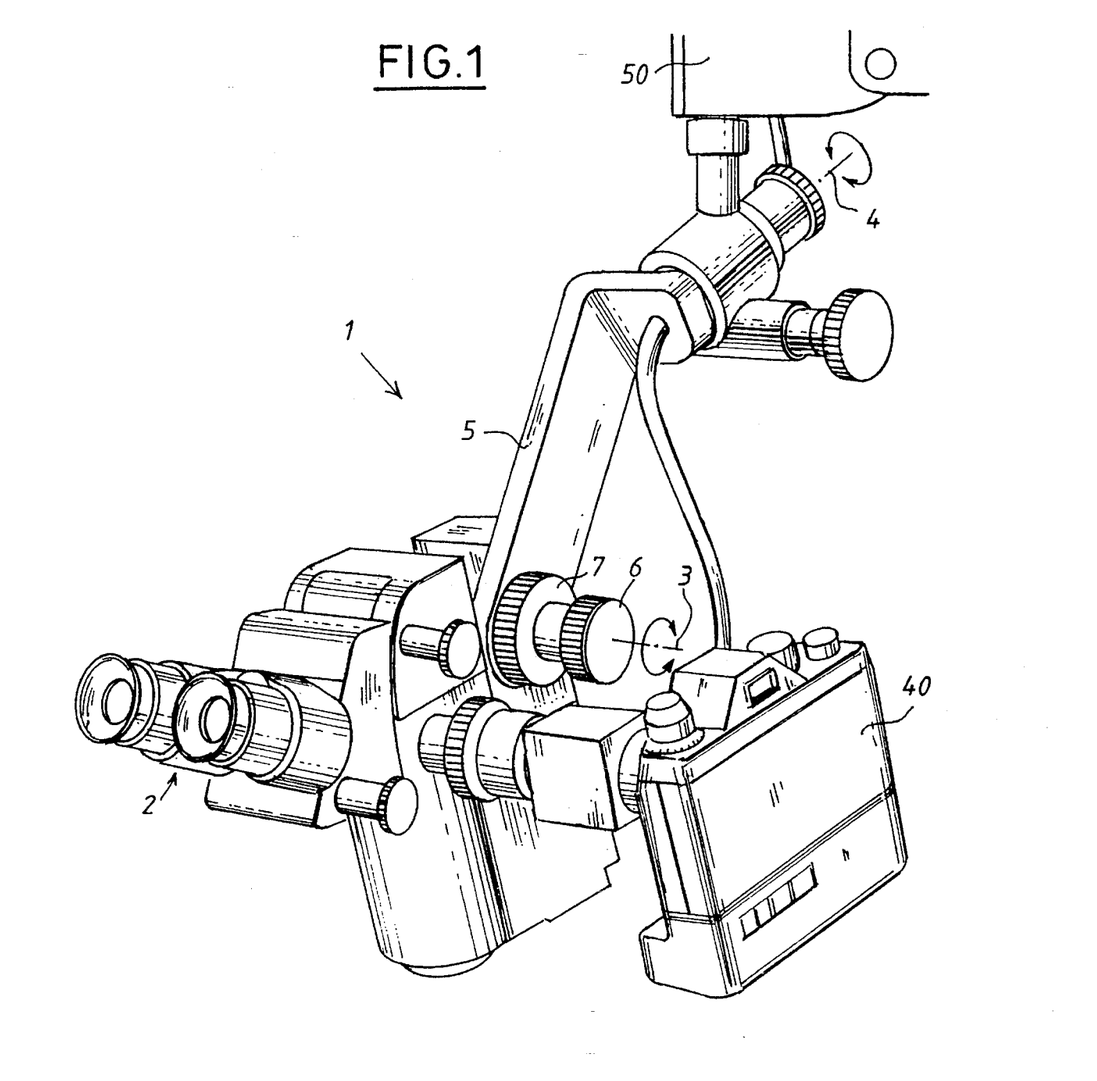
FIG. 1 is a perspective schematic diagram of a surgical microscope equipped with an adjustable stand according to the invention.

In FIG. 1, reference numeral 1 identifies the part of the adjustable stand which is connected to the surgical microscope 2. A flange or bracket 50 is provided for attachment to the stand or to the ceiling or on the wall. The surgical microscope can be pivoted about axis 4 and tilted about axis 3 manually. The range of rotation with reference to a preselected base position extends ±30° with respect to the base position. The carrier 5 interconnects the tilt axis 3 and the pivot axis 4. Reference numeral 40 identifies a camera which is attached as an accessory part to the stand 1. This accessory part effects a change of weight which acts on the stand.

Figure 2:
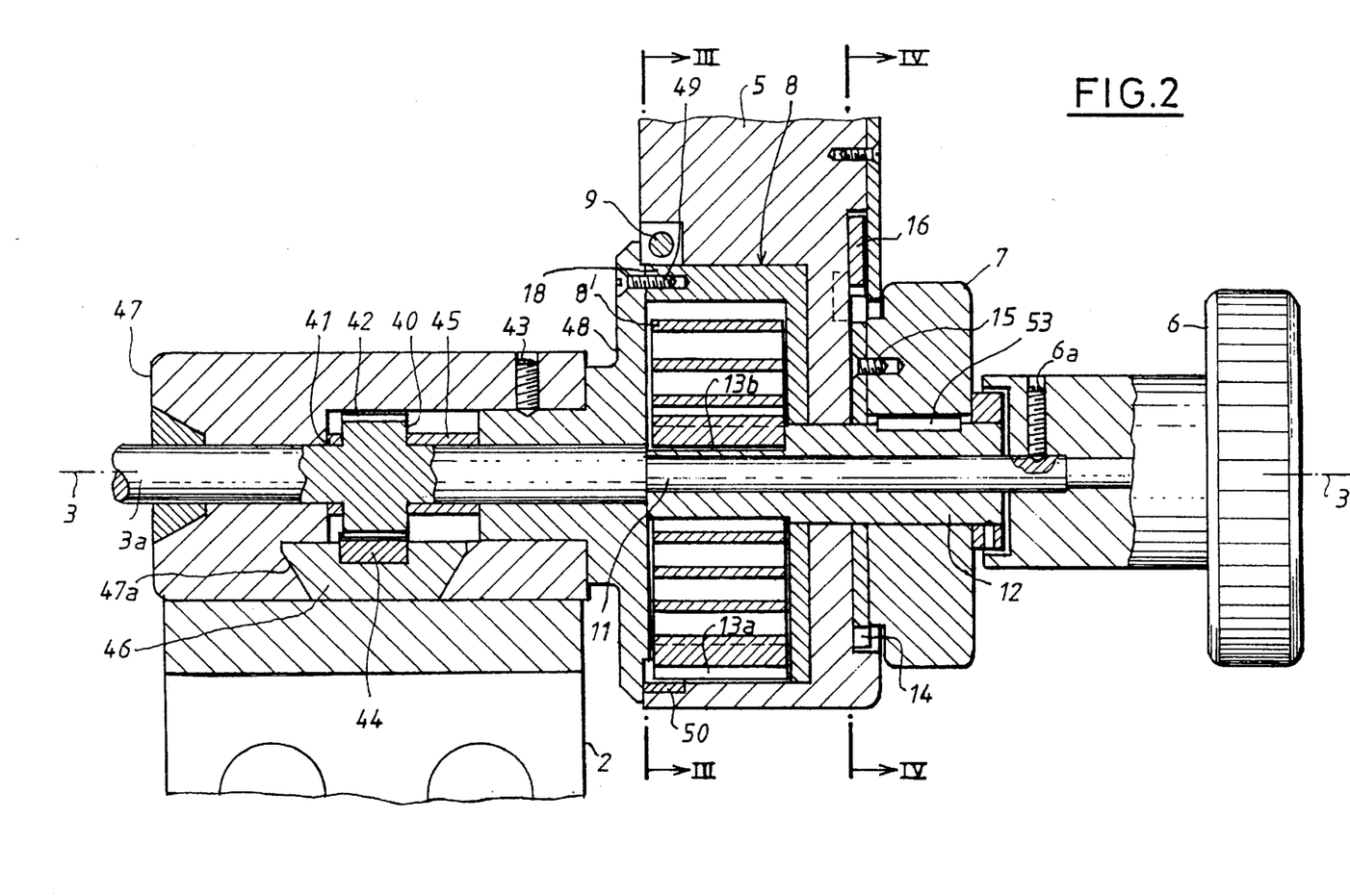
FIG. 2 is a section view, taken along line II—II of FIG. 3, of an arrangement of an energy store configured as a spiral flat spring equipped with a double latching device for effecting a manual pretensioning of the spring.

FIG. 2 shows that portion of the adjustable stand 1, in section, which is connected to the energy store according to a feature of the invention. Reference numeral 3a identifies the tilt shaft of the surgical microscope 2 which defines the tilt axis 3. The tilt shaft 3a is rotatably journalled in part 47 and includes an inner shaft segment 11 about which the following are arranged: the spring core shaft 12, the carrier 5 and the spring housing 18 of the energy store 8. The shaft segment 11 of tilt shaft 3a is rotatably journalled within the core shaft 12 and the hand wheel 6 is fixed to shaft segment 11 by set screw 6a.

The microscope 2 is adjusted in tilt position by manually tilting the same about tilt axis 3. On the other hand, the hand wheel 6 is used to focus the microscope 2. The part 47 defines a V-shaped rail 47a for receiving a dovetail piece 46 of the microscope 2 in slidable engagement therewith. A linear rack gear 44 is held in the base of dovetail piece 46. The tilt shaft 3a includes a gear wheel 40 formed thereon having gear teeth 42 which mesh with the gear teeth of rack gear 44. When the operator rotates the hand wheel 6, the gear wheel 40 rotates and the microscope 2 is moved linearly into the plane of the drawing along rail 47a thereby focusing the microscope. Spacer sleeves 41 and 45 hold the gear wheel 40 in place to ensure that the gear teeth 42 remain in meshing engagement with the teeth of rack gear 44.

Figure 3:
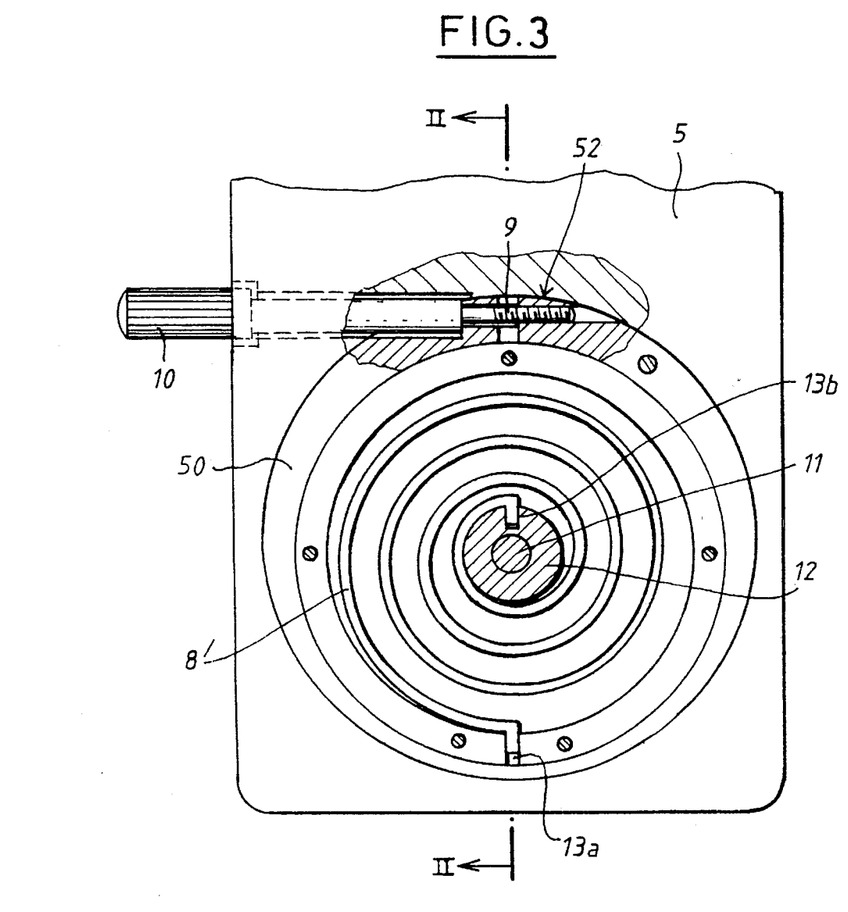
FIG. 3 is a partial section view of the arrangement of FIG. 2 taken along line III—III of FIG. 2.

The energy store 8 includes a spring housing 18 and a spring 8' is disposed in the interior of the spring housing. The spring housing 18 is seated in carrier 5 so as to be rotatable relative thereto. The energy store 8 here comprises the spring 8' as a spiral flat spring which is provided, for example, with inner and outer angle hooks (13a, 13b) as shown in FIG. 3. The spring 8' has a very flat characteristic. As an energy store, this spiral flat spring 8' receives a torque which is developed by rotating the spring core 12 with the spring housing 18 stationary or by rotating the spring housing 18 with the spring core 12 stationary.

Part 48 is connected to spring housing 18 via threaded fastener 49 and part 47 is held to part 48 via set screw 43. Accordingly, parts 47 and 48 rotate with any rotation of spring housing 18 in carrier 5.

Referring to FIG. 3, a desired adjusting torque from almost zero Newton-meter to fixed-clamping can be adjusted with the set screw 10 about the tilt shaft 3a. The set screw 10 includes a threaded portion 9 which threadably engages a split collar 50. The set screw 10 and split collar 50 conjointly define a clamp 52 which can be locked to hold the spring housing 18 at a desired angular position relative to the carrier 5.

For reasons of safety, the setting of the torque (tensioning and release of tension) is, for example, effected via a double latching device manually, with a motor or automatically.

Figure 4:
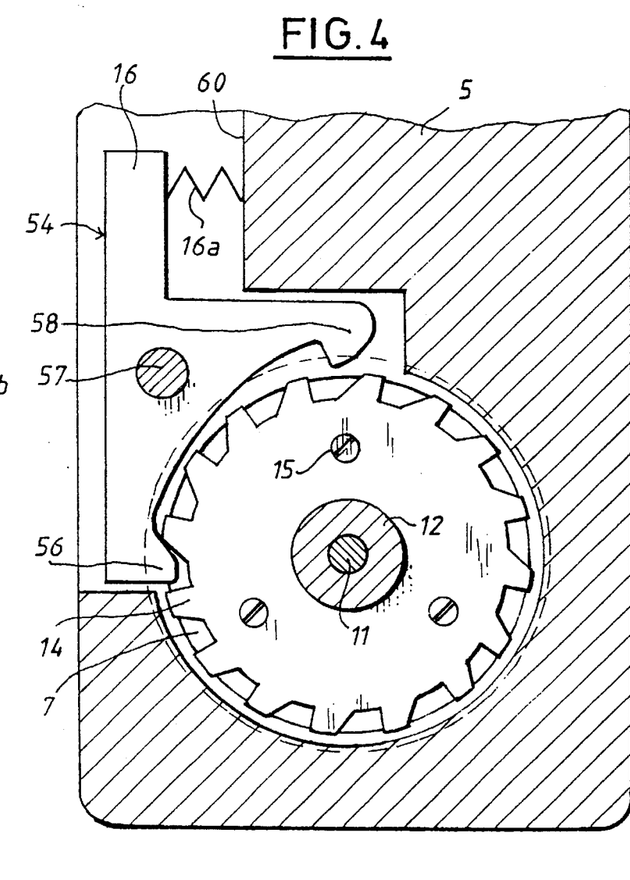
FIG. 4 is a partial section view of the arrangement of FIG. 2 taken along line IV—IV of FIG. 2.

As shown in FIG. 4, the double latching device 54 comprises the latching lever 16 and the toothed wheel 14. Pretensioning of the spiral flat spring 8' takes place via a hand wheel 7 which is connected to the toothed wheel 14 by means of screws 15 in the embodiment shown.

Referring again to FIG. 2, the hand wheel 7 is keyed to the core shaft 12 by a Woodruff key 53 so that the core shaft will rotate with the hand wheel. The core shaft 12 is rotatably journalled in carrier 5 and is also rotatable relative to spring housing 18. The hand wheel 7 is connected to the spring core or core shaft 12 via the Woodruff key 53 so that the spring core 12 can be rotated manually for loading the spiral flat spring 8'.

The latching lever 16 of double latching device 54 includes two projections 56 and 58 as shown in FIG. 4. The latching lever 16 is pivotally mounted on pivot pin 57. A spring 16a resiliently presses the lever 16 so that projection 56 engages the teeth of the toothed wheel 14. When lever 16 is pushed to the right toward surface 60, the projection 58 engages the toothed wheel thereby permitting the toothed wheel 14 to rotate by only one tooth notch.

Figure 5:
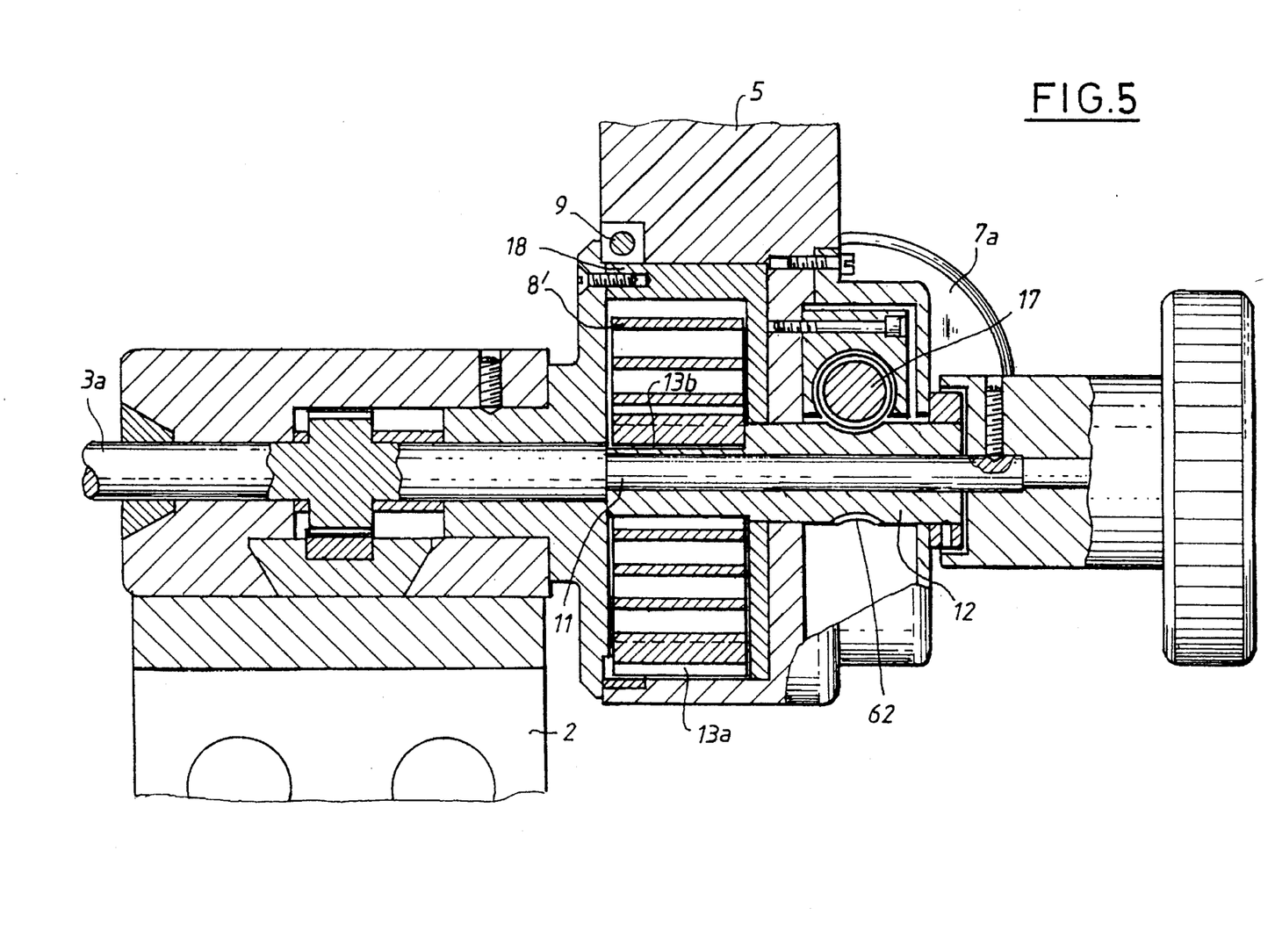
FIG. 5 is a section view of the energy store shown in FIG. 2 equipped with a worm screw for effecting manual pretensioning.

FIG. 5 shows an embodiment of the invention wherein the energy store is adjusted via a self-holding worm gear 17. The embodiment shown in FIG. 5 is identical to that shown in FIG. 2 except for the manner in which the energy store is adjusted. For this reason, FIG. 5 includes the same reference numerals as FIG. 2. The worm gear 17 engages a corresponding gear 62 formed in the core shaft 12. The worm gear 17 is actuated manually by hand wheel 7a.

Figure 6:
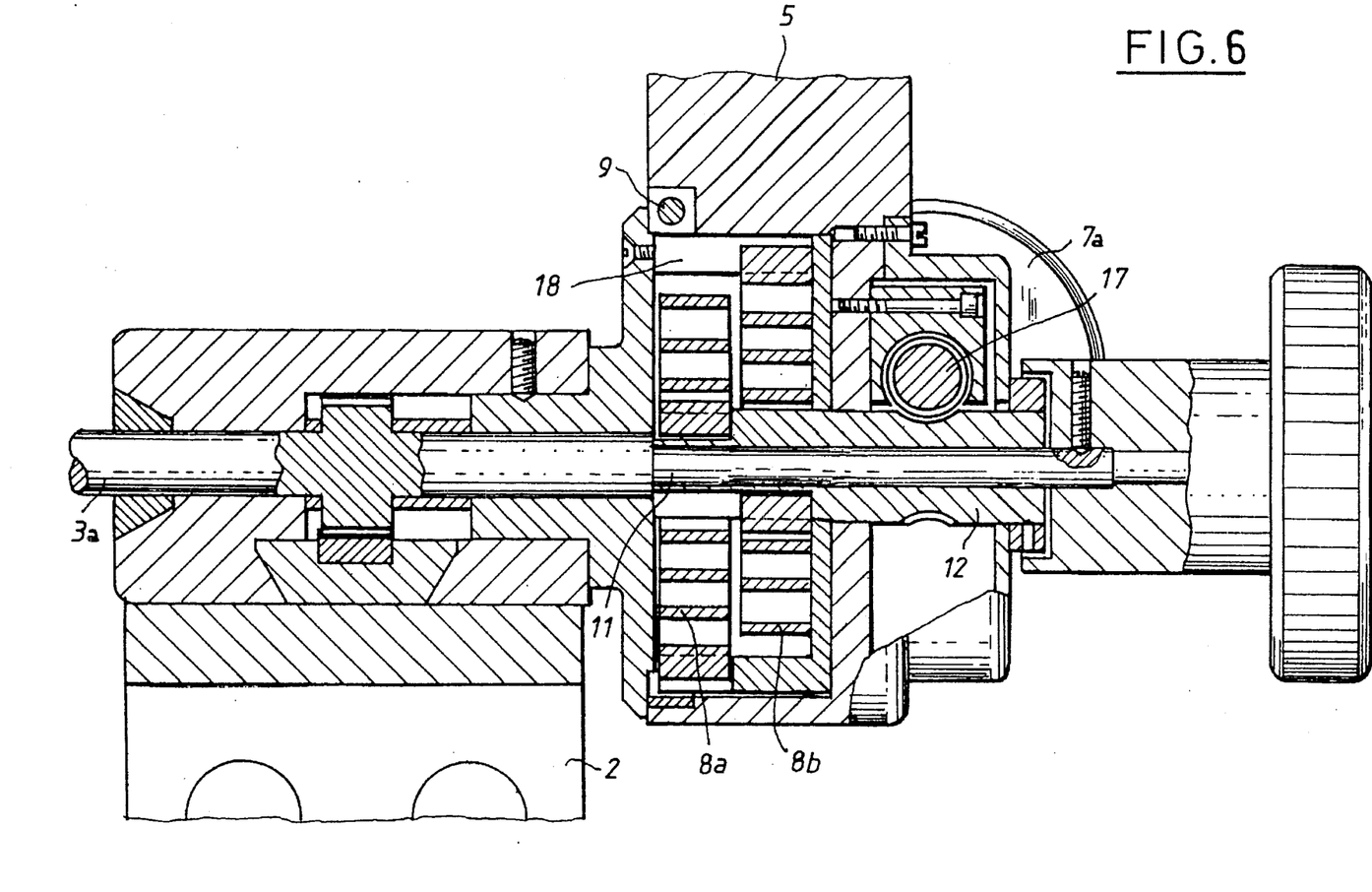
FIG. 6 is a section view of another embodiment of an energy store which includes two spiral flat springs which operate in mutually opposing directions to each other.

An embodiment of the energy store is shown in FIG. 6 wherein the energy store includes first and second spiral flat springs 8a and 8b which act in opposition to each other. The second flat spring 8b is likewise disposed in the spring housing 18 and is connected between the spring housing 18 and the spring core 12. The remaining parts of the embodiment are identical with those shown in FIG. 5.

Figure 7:
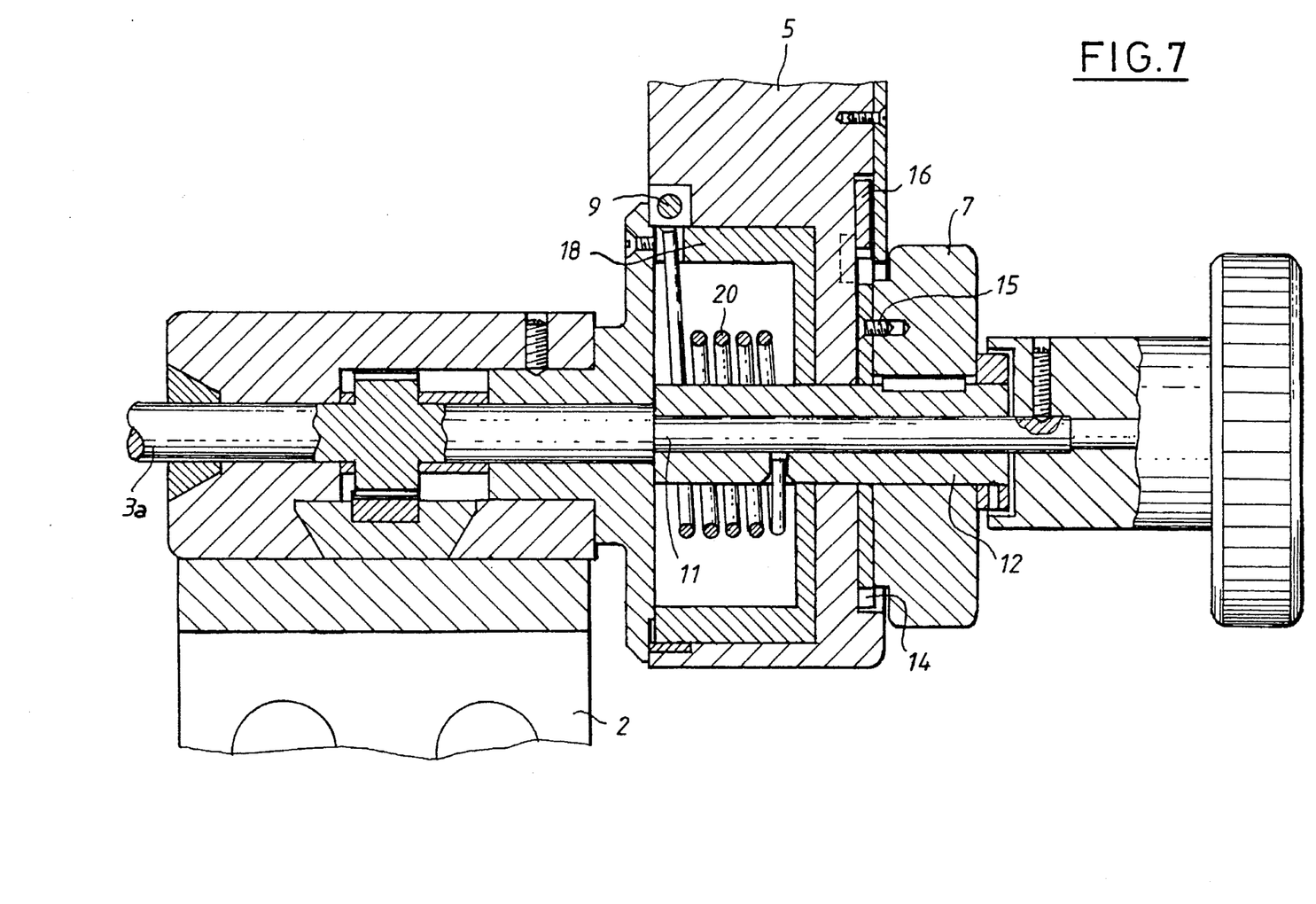
FIG. 7 is a section view of another embodiment of the energy store which includes a torsion spring.

An embodiment of the energy store is shown in FIG. 7 wherein the energy store includes a torsion spring 20 which can be adjusted via a double latching device in the manner shown for the embodiment of FIG. 2.

In each of the embodiments shown in FIGS. 2, 5, 6 and 7, the energy store utilized is connected to the tilt shaft 3a of the adjustable stand 1. The tilt shaft 3a also embodies the focusing axis of the surgical microscope 2. The energy store shown in FIGS. 2, 5, 6 and 7 can also be connected to a pivot shaft defining the pivot axis 4 of the stand.

Figure 8:
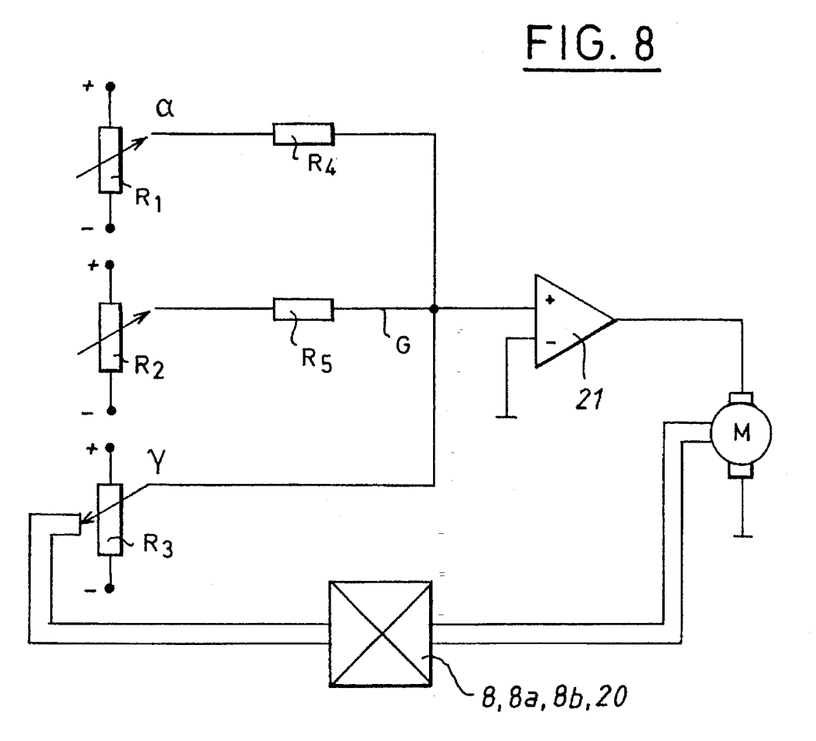
FIG. 8 is a circuit diagram of an arrangement for setting the energy store shown in FIGS. 2 to 7 with the aid of a motor; and, FIG. 9 is a circuit diagram of an arrangement for automatically setting the energy store shown in FIGS. 2 to 7.

FIG. 8 shows a circuit arrangement for effecting a semi-automatic adjustment for the energy stores shown in FIGS. 2, 5, 6 and 7. The microscope position is taken off as an angle $\alpha$ on the adjustable resistor $R_1$ and is applied to the controller 21 via the resistor $R_4$.

The particular weight of the microscope accessory can be set on the adjustable resistor $R_2$ and applied to the controller 21 via the resistor $R_5$. The controller 21 adjusts the energy store (8, 8a, 8b, 20) via the positioning motor M. This effects a displacement $\gamma$ via the spring force of the energy store. This displacement is fed back via resistor $R_3$ to the controller 21 until balance is achieved. The change of the spring force via the adjusting angle effects the balancing of the surgical microscope during tilting and pivoting as a function of the microscope position $\alpha$ and the weight G.

Figure 9:
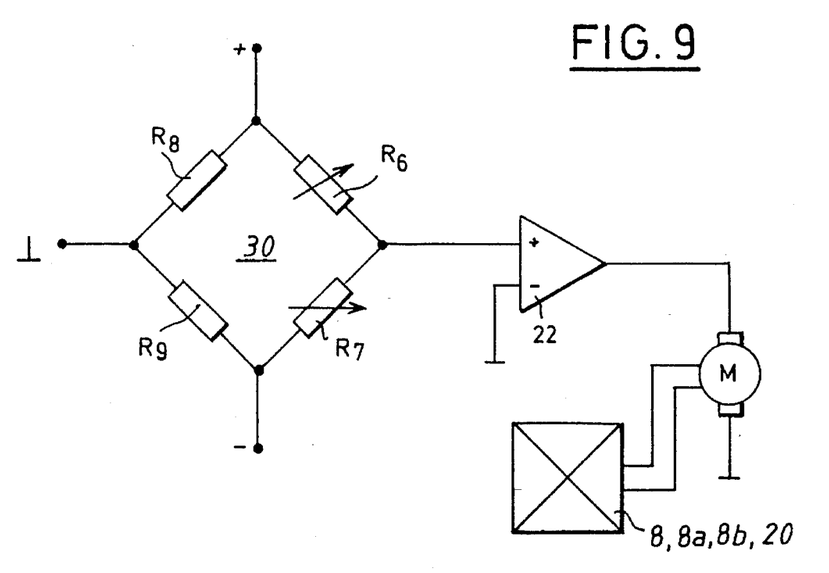

FIG. 9 shows another circuit diagram for an automatic adjustment of the energy store via sensors in a bridge circuit 30 having resistors ($R_8$, $R_9$) and the sensor resistors ($R_6$, $R_7$). The sensors can, for example, be configured as strain gauges. The circuit of FIG. 9 also includes a controller 22 and a positioning motor M for the spiral flat spring (8, 8a, 8b) or the torsion spring 20.

FIGS. 2 to 7 show energy stores which comprise elastically deformable steel springs. However, it is also possible within the scope of the invention to provide energy stores which comprise elastically deformable high polymer solids or liquids.

It is understood that the foregoing description is that of the preferred embodiments of the invention and that various changes and modifications may be made thereto without departing from the spirit and scope of the invention as defined in the appended claims.

What is claimed is:

1. An adjustable stand for an optical viewing apparatus such as a surgical microscope pivotable about at least one pivot axis, the adjustable stand being attachable to a desired location on a pedestal, an additional stand, ceiling or wall, the adjustable stand and the optical viewing apparatus conjointly defining a center of gravity which can shift to produce an unwanted unbalancing torque when accessories are added to the microscope and/or when there is angular movement about said axis, the adjustable stand comprising:

a mounting bracket for attaching the stand at the desired location;

a pivot shaft defining said pivot axis;

a carrier operatively connected to said mounting bracket and holding said pivot shaft;

elastically deformable energy storage means mounted on said shaft for releasing stored torque energy in response to said shift to balance said unwanted unbalancing torque;

adjusting means for loading said storage means with a predetermined torque;

said energy storage means including a spiral flat spring having a flat characteristic; and, a housing defining a space for accommodating said spiral flat spring therein; and, said housing including friction setting means for reducing or increasing the size of said space to adjust the friction between said spiral flat spring and said housing.

2. The adjustable stand of claim 1, wherein the viewing apparatus is also tiltable about a tilt axis about which said unwanted unbalancing torque can also be produced because of said shift, the adjustable stand further comprising a tilt shaft defining said tilt axis; said carrier interconnecting said tilt and pivot shafts; and, said elastically deformable energy storage means being mounted on at least one of said shafts for releasing said stored torque energy in response to said shift to balance said unwanted unbalancing torque.

3. The adjustable stand of claim 2, said spiral flat spring being made of a metal alloy.

4. The adjustable stand of claim 2, said spiral flat spring being made of steel.

5. The adjustable stand of claim 2, said energy storage means comprising:

a spring housing mounted in said carrier;

a spring core mounted on said shaft; and, a torsion spring disposed in said spring housing and connected between said spring housing and said spring core for storing said torque; and, said adjusting means including said spring housing and said spring core as being mounted so as to be rotatable relative to each other for loading said predetermined torque into said torsion spring.

6. The adjustable stand of claim 2, said at least one shaft being said tilt shaft.

7. The adjustable stand of claim 2, said at least one shaft being said pivot shaft.

8. The adjustable stand of claim 2, said elastically deformable energy storage means being a first energy source mounted on said tilt shaft; and, said adjustable stand further comprising a second elastically deformable energy source mounted on said pivot shaft.

9. The adjustable stand of claim 2, said energy storage means comprising:

a spring housing mounted in said carrier;

a spring core mounted on said shaft;

said spiral flat spring being disposed in said spring housing and connected between said spring housing and said spring core for storing said torque energy; and, said adjusting means including said spring housing and said spring core as being mounted so as to be rotatable relative to each other for loading said predetermined torque into said spring.

10. The adjustable stand of claim 9, said adjusting means comprising a lever pivotally mounted on said carrier and a toothed wheel fixedly connected to said spring core; and, said lever having a pair of projections for selectively engaging said toothed wheel.

11. The adjustable stand of claim 9, said adjusting means comprising a hand wheel connected to said spring core for permitting said spring core to be rotated manually for loading said spiral flat spring.

12. The adjustable stand of claim 9, said adjusting means comprising motor means effecting the rotation of said spring core and said spring housing relative to each other for adjusting said predetermined torque.

13. The adjustable stand of claim 9, said spring core being tubular to accommodate said shaft therein.

14. The adjustable stand of claim 1, said flat spiral spring having a plurality of turns all lying in a single plane perpendicular to said pivot axis.

15. An adjustable stand for an optical viewing apparatus such as a surgical microscope pivotable about at least one pivot axis, the adjustable stand being attachable to a desired location on a pedestal, an additional stand, ceiling or wall, the adjustable stand and the optical viewing apparatus conjointly defining a center of gravity which can shift to produce an unwanted unbalancing torque when accessories are added to the microscope and/or when there is angular movement about said axis, the viewing apparatus also being tiltable about a tilt axis about which said unwanted unbalancing torque can also be produced because of said shift, the adjustable stand comprising:

a mounting bracket for attaching the stand at the desired location;

a pivot shaft defining said pivot axis;

a carrier operatively connected to said mounting bracket and holding said pivot shaft;

elastically deformable energy storage means mounted on said shaft for releasing stored torque energy in response to said shift to balance said unwanted unbalancing torque;

adjusting means for loading said storage means with a predetermined torque;

said energy storage means including a spiral flat spring having a flat characteristic;

a tilt shaft defining said tilt axis; said carrier interconnecting said tilt and pivot shafts; and, said elastically deformable energy storage means being mounted on at least one of said shafts for releasing said stored torque energy in response to said shift to balance said unwanted unbalancing torque;

said energy storage means including: a spring housing mounted in said carrier; a spring core mounted on said shaft; and, said spiral flat spring being disposed in said spring housing and connected between said spring housing and said spring core for storing said torque energy;

said adjusting means including said spring housing and said spring core as being mounted so as to be rotatable relative to each other for loading said predetermined torque into said spring; and, said spiral flat spring being a first spring and said energy storage means further including a second spiral flat spring likewise disposed in said spring housing and connected between said spring housing and said spring core so as to act parallel to said first spring.

16. The adjustable stand of claim 15, said second spiral flat spring being connected between said spring housing and said spring core so as to act counter to said first spring.

17. The adjustable stand of claim 15, said adjusting means comprising holding means fixedly arranged on said carrier; and, a worm gear threadably mounted in said holding means for engaging and rotating said spring core relative to said spring housing.

18. The adjustable stand of claim 15, said adjusting means comprising means for adjusting a displacement torque on said spring housing over a range from zero Newton-meters to fixed clamping.

19. An adjustable stand for an optical viewing apparatus such as a surgical microscope pivotable about at least one pivot axis, the adjustable stand being attachable to a desired location on a pedestal, an additional stand, ceiling or wall, the adjustable stand and the optical viewing apparatus conjointly defining a center of gravity which can shift to produce an unwanted unbalancing torque when accessories are added to the microscope and/or when there is angular movement about said axis, the viewing apparatus being also tiltable about a tilt axis about which said unwanted unbalancing torque can also be produced because of said shift, the adjustable stand comprising:

a mounting bracket for attaching the stand at the desired location;

a pivot shaft defining said pivot axis;

a carrier operatively connected to said mounting bracket and holding said pivot shaft;

elastically deformable energy storage means mounted on said shaft for releasing stored torque energy in response to said shift to balance said unwanted unbalancing torque;

adjusting means for loading said storage means with a predetermined torque;

a tilt shaft defining said tilt axis;

said carrier interconnecting said tilt and pivot shafts;

said elastically deformable energy storage means being mounted on at least one of said shafts for releasing said stored torque energy in response to said shift to balance said unwanted unbalancing torque;

said energy storage means including: a spring housing mounted in said carrier; a spring core mounted on said shaft; and, a spiral flat spring disposed in said spring housing and connected between said spring housing and said spring core for storing said torque energy;

said adjusting means including said spring housing and said spring core as being mounted so as to be rotatable relative to each other for loading said predetermined torque into said spring; and, said adjusting means further including holding means fixedly arranged on said carrier; and, a worm gear threadably mounted in said holding means for engaging and rotating said spring core relative to said spring housing.

20. The adjustable stand of claim 19, said adjusting means comprising a hand wheel connected to said spring core for permitting said spring core to be rotated manually for loading said spiral flat spring.

21. The adjustable stand of claim 19, said adjusting means comprising motor means effecting the rotation of said spring core and said spring housing relative to each other for adjusting said predetermined torque.

22. The adjustable stand of claim 19, said adjusting means comprising means for adjusting a displacement torque on said spring housing over a range from zero Newton-meters to fixed clamping.

23. The adjustable stand of claim 19, said spring core being hollow.

24. An adjustable stand for an optical viewing apparatus such as a surgical microscope pivotable about at least one pivot axis, the adjustable stand being attachable to a desired location on a pedestal, an additional stand, ceiling or wall, the adjustable stand and the optical viewing apparatus conjointly defining a center of gravity which can shift to produce an unwanted unbalancing torque when accessories are added to the microscope and/or when there is angular movement about said axis, the adjustable stand comprising:

a mounting bracket for attaching the stand at the desired location;

a pivot shaft defining said pivot axis;

a carrier operatively connected to said mounting bracket and holding said pivot shaft;

said carrier including a housing;

elastically deformable energy storage means mounted on said shaft and in said housing for releasing stored torque energy in response to said shift to balance said unwanted unbalancing torque;

adjusting means for biasing said storage means with a predetermined torque; and, friction setting means for adjusting a predetermined friction between said housing and said energy storage means for the rotational/pivot movement about said pivot axis.

25. The adjustable stand of claim 24, wherein the viewing apparatus is also tiltable about a tilt axis about which said unwanted unbalancing torque can also be produced because of said shift, the adjustable stand further comprising a tilt shaft defining said tilt axis; said carrier interconnecting said tilt and pivot shafts; and, said elastically deformable energy storage means being mounted on at least one of said shafts for releasing said stored torque energy in response to said shift to balance said unwanted unbalancing torque.

26. The adjustable stand of claim 25, said energy storage means comprising:

said housing and said housing being mounted in said carrier;

a spring core mounted on said shaft;

a spiral flat spring disposed in said spring housing and connected between said spring housing and said spring core for storing said torque energy; and, said adjusting means including said spring housing and said spring core as being mounted so as to be rotatable relative to each other for loading said predetermined torque into said spring.

27. The adjustable stand of claim 26, said spiral flat spring being a first spring and said energy storage means further comprising a second spiral flat spring likewise disposed in said spring housing and connected between said spring housing said spring core so as to act counter to said first spring.

28. An adjustable stand for an optical viewing apparatus such as a surgical microscope pivotable about at least one pivot axis, the adjustable stand being attachable to a desired location on a pedestal, an additional stand, ceiling or wall, the adjustable stand and the optical viewing apparatus conjointly defining a center of gravity which can shift to produce an unwanted unbalancing torque when accessories are added to the microscope and/or when there is angular movement about said axis, the viewing apparatus also being tiltable about a tilt axis about which said unwanted unbalancing torque can also be produced because of said shift, the adjustable stand comprising:

a mounting bracket for attaching the stand at the desired location;

a pivot shaft defining said pivot axis;

a carrier operatively connected to said mounting bracket and holding said pivot shaft;

elastically deformable energy storage means mounted on said shaft for releasing stored torque energy in response to said shift to balance said unwanted unbalancing torque;

adjusting means for biasing said storage means with a predetermined torque and for adjusting a predetermined friction for the rotational/pivot movement about said pivot axis;

a tilt shaft defining said tilt axis; said carrier interconnecting said tilt and pivot shafts; and, said elastically deformable energy storage means being mounted on at least one of said shafts for releasing said stored torque energy in response to said shift to balance said unwanted unbalancing torque;

said energy storage means including:

a spring housing mounted in said carrier;

a spring core mounted on said shaft;

a spiral flat spring disposed in said spring housing and connected between said spring housing and said spring core for storing said torque energy;

said adjusting means including said spring housing and said spring core as being mounted so as to be rotatable relative to each other for loading said predetermined torque into said spring; and said spiral flat spring being a first spring and said energy storage means further including a second spiral flat spring likewise disposed in said spring housing and connected between said spring housing and said spring core so as to act parallel to said first spring.

29. The adjustable stand of claim 28, said adjusting means comprising a lever pivotally mounted on said carrier and a toothed wheel fixedly connected to said spring core; and said lever having a pair of projections for selectively engaging said toothed wheel.

30. The adjustable stand of claim 28, said adjusting means comprising holding means fixedly arranged on said carrier; and, a worm gear threadably mounted in said holding means for engaging and rotating said spring core relative to said spring housing.

31. The adjustable stand of claim 28, further comprising a housing for accommodating said energy storage means therein and said housing being rotatably journalled in said carrier so as to be rotatable about said pivot axis; and, said adjusting means including a split collar disposed around said housing; a set screw for engaging said split collar; and, said set screw and said split collar conjointly defining a clamp which can be locked to hold said housing at a desired angular position about said pivot axis relative to said carrier.

32. An adjustable stand for an optical viewing apparatus such as a surgical microscope pivotable about at least one pivot axis, the adjustable stand being attachable to a desired location on a pedestal, an additional stand, ceiling or wall, the adjustable stand and the optical viewing apparatus conjointly defining a center of gravity which can shift to produce an unwanted unbalancing torque when accessories are added to the microscope and/or when there is angular movement about said axis, the adjustable stand comprising:

a mounting bracket for attaching the stand at the desired location;

a pivot shaft defining said pivot axis;

a carrier operatively connected to said mounting bracket and holding said pivot shaft;

means for pivoting said surgical microscope about said pivot axis to any desired angular base position;

elastically deformable energy storage means mounted on said shaft for releasing stored torque energy in response to said shift to balance said unwanted unbalancing torque; and, adjusting means for biasing said storage means with a predetermined compensating torque about said pivot axis separately and entirely independently of said pivoting means after said surgical microscope is in said angular base position.

* * * * *